(12) United States Patent
Karale

(10) Patent No.: US 9,234,126 B2
(45) Date of Patent: Jan. 12, 2016

(54) DUAL RETARDED ACID SYSTEM FOR WELL STIMULATION

(71) Applicant: Halliburton Energy Services, Inc., Houston, TX (US)

(72) Inventor: Chaitanya M Karale, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 211 days.

(21) Appl. No.: 13/887,462

(22) Filed: May 6, 2013

(65) Prior Publication Data

US 2014/0329725 A1 Nov. 6, 2014

(51) Int. Cl.
| | |
|---|---|
| *C09K 8/588* | (2006.01) |
| *C23F 11/18* | (2006.01) |
| *E21B 43/26* | (2006.01) |
| *C09K 8/72* | (2006.01) |
| *C09K 8/82* | (2006.01) |

(52) U.S. Cl.
CPC . *C09K 8/725* (2013.01); *C09K 8/72* (2013.01); *C09K 8/82* (2013.01)

(58) Field of Classification Search
CPC ........................................................ C09K 8/60
USPC ................ 507/221, 225, 271, 937; 166/305.1
See application file for complete search history.

(56) References Cited

U.S. PATENT DOCUMENTS

| | | | |
|---|---|---|---|
| 4,233,165 A | 11/1980 | Salathiel et al. | |
| 4,322,306 A | 3/1982 | Dill | |
| 4,843,118 A | 6/1989 | Lai et al. | |
| 5,355,958 A * | 10/1994 | Pauls et al. | 166/307 |
| 2008/0078549 A1 | 4/2008 | Moorehead et al. | |
| 2009/0298720 A1 | 12/2009 | Nguyen et al. | |
| 2012/0181029 A1 | 7/2012 | Saini et al. | |
| 2014/0073540 A1 * | 3/2014 | Berry et al. | 507/221 |

FOREIGN PATENT DOCUMENTS

EP 278540 A2 * 8/1988

OTHER PUBLICATIONS

Hisham A. Nasr-El-Din, Saad Al-Dirweesh, Mathew Samuel, "Development and Field Application of a New, Highly Stable Emulsified Acid," SPE 115926, 2008 SPE Annual Technical Conference and Exhibition, Denver, Colorado, Sep. 21-24, 2008, 11 pages.

M.A. Buijse, M.S Van Domelen, "Novel Application of Emulsified Acids to Matrix Stimulation of Heterogeneous Formations," SPE 39583, 1998 SPE International Symposium on Formation Damage Control, Lafayette, Louisiana, Feb. 18-19, 1998, 11 pages.

Darren McDuff, Shalawn Jackson, Chris Shuchart, Dieter Postl, "Understanding Wormholes in Carbonates: Unprecedented Experimental Scale and 3D Visualization," SPE 129329, Technology Today Series, JPT, Oct. 2010, pp. 78-81.

Ernesto Barragan, Fabrizio Serrano, Marco Cayo, Cristian Ramirez, Carlos Martinez, "Cleanup Acid System for Gravel-Pack Completions Without Increasing Water Production," SPE 123869, 2009 SPE Annual Technical Conference and Exhibition, New Orleans, Louisiana, Oct. 4-7, 2009, 9 pages.

Gerald Glasbergen, Nitika Kalia, Malcolm Talbot, "The Optimum Injection Rate for Wormhole Propagation: Myth or Reality?," SPE 121464, 2009 SPE European Formation Damage Conference, Scheveningen, The Netherlands, May 27-29, 2009, 16 pages.

Nitika Kalia, Gerard Glasbergen, "Wormhole Formation in Carbonates Under Varying Temperature Conditions," SPE 121803, 2009 SPE European Formation Damage Conference, Scheveningen, The Netherlands, May 27-29, 2009, 19 pages.

Jose A. Mora, Felix Kondo, Sandra Gonzalez Pinto, "The Challenge of Producing and Stimulating a Deep Sandstone-Carbonate Reservoir with Combined Organic and Inorganic Formation Damage," SPE 121008, 2009 SPE Western Regional Meeting, San Jose, California, Mar. 24-26, 2009, 19 pages.

R. Gdanski, "Recent Advances in Carbonate Stimulation," IPTC 10693, International Petroleum Technology Conference, Doha, Qatar, Nov. 21-23, 2005, 8 pages.

R.D. Gdanski, "Kinetics of the Primary Reaction of HF on Alumino-Silicates," SPE 66564, SPE Production & Facilities vol. 15, No. 4, Nov. 2000, pp. 279-287.

William C. Griffin, "Classification of Surface-Active Agents by 'HLB'," Journal of the Society of Cosmetic Chemists, Presented at the Chicago Chapter Meeting, Chicago, Ill., Oct. 11, 1949, pp. 311-326.

William C. Griffin, "Calculation of HLB Values of Non-Ionic Surfactants," Journal of the Society of Cosmetic Chemists, New York City Meeting, May 14, 1954, pp. 249-256.

J.T. Davies, "A Quantitative Kinetic Theory of Emulsion Type. I. Physical Chemistry of the Emulsifying Agent," Proceedings of 2nd International Congress Surface Activity, Butterworths, London, 1957, pp. 426-438.

International Search Report and Written Opinion dated Jun. 13, 2014 for Application No. PCT/US2014/019200.

* cited by examiner

*Primary Examiner* — Aiqun Li
(74) *Attorney, Agent, or Firm* — Holly Soehnge; Baker Botts L.L.P.

(57) ABSTRACT

A composition in the form of an emulsion having: (i) a continuous oil phase comprising: (a) an oil; (b) an emulsifier; and (ii) an internal aqueous phase comprising: (a) water; (b) acid such that the aqueous phase has an initial pH of less than about 2; (c) a viscosity-increasing agent; and (d) a crosslinker, wherein the crosslinker is selected or controlled to crosslink the viscosity-increasing agent at a pH range somewhere in a range of about 1.5 to about 6.5 and that is at least higher than the initial pH of the aqueous phase. A method of acidizing a treatment zone of a subterranean formation in a well includes the steps of: (A) forming a treatment fluid comprising such a composition; and (B) introducing the treatment fluid into a well.

11 Claims, No Drawings

DUAL RETARDED ACID SYSTEM FOR WELL STIMULATION

CROSS-REFERENCE TO RELATED APPLICATIONS

Not applicable.

TECHNICAL FIELD

The inventions are in the field of producing crude oil or natural gas from subterranean formations. More specifically, the inventions generally relate to compositions and methods acidizing a subterranean formation. The compositions and methods are particularly useful in carbonate formations.

BACKGROUND

To produce oil or gas, a well is drilled into a subterranean formation that is an oil or gas reservoir.

Drilling, completion, and intervention operations can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments include, but are not limited to, damage removal, formation isolation, wellbore cleanout, scale removal, and scale control. Of course, other well treatments and treatment fluids are known in the art.

Acidizing

A widely used stimulation technique is acidizing, in which a treatment fluid including or forming an aqueous acid solution is introduced into the formation to dissolve acid-soluble materials. This can accomplish a number of purposes, which can be, for example, to help remove residual fluid material or filtercake damage or to increase the permeability of a treatment zone. In this way, hydrocarbon fluids can more easily flow from the formation into the well. In addition, an acid treatment can facilitate the flow of injected treatment fluids from the well into the formation. This procedure enhances production by increasing the effective well radius.

Acidizing techniques can be carried out as matrix acidizing procedures or as acid fracturing procedures. Matrix treatments are often applied in treatment zones having good natural permeability to counteract damage in the near-wellbore area. Fracturing treatments are often applied in treatment zones having poor natural permeability.

In matrix acidizing, an acidizing fluid is injected from the well into the formation at a rate and pressure below the pressure sufficient to create a fracture in the formation. In sandstone formations, the acid primarily removes or dissolves acid soluble damage in the near wellbore region and is thus classically considered a damage removal technique and not a stimulation technique. In carbonate formations, the goal is to actually a stimulation treatment where in the acid forms conducted channels called wormholes in the formation rock.

In acid fracturing, an acidizing fluid is pumped into a carbonate formation at a sufficient pressure to cause fracturing of the formation and creating differential (non-uniform) etching fracture conductivity. Acid fracturing involves the formation of one or more fractures in the formation and the introduction of an aqueous acidizing fluid into the fractures to etch the fractures faces, whereby flow channels are formed when the fractures close. The aqueous acidizing fluid also enlarges the pore spaces in the fracture faces and in the formation. In acid fracturing treatments, one or more fractures are produced in the formation and the acidic solution is introduced into the fracture to etch flow channels in the fracture face. The acid also enlarges the pore spaces in the fracture face and in the formation.

Greater details, methodology, and exceptions regarding acidizing can be found in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, 66564-PA, and the references contained therein.

The use of the term "acidizing" herein refers to both matrix and fracturing types of acidizing treatments, and more specifically, refers to the general process of introducing an acid down hole to perform a desired function, e.g., to acidize a portion of a subterranean formation or any damage contained therein.

Carbonate Formations

Carbonate formations tend to have complex porosity and permeability variations and irregular fluid flow paths. Even small improvements in recovery methods can yield dramatic production results.

It is desirable to extend the production of wells in carbonate reservoirs and to avoid early abandonment when productivity decreases as a result of formation damage or low natural permeability. In clastic reservoirs, a range of stimulation techniques can be applied with a high degree of confidence to create conductive flow paths, primarily using hydraulic fracturing techniques as known in the field. Although many of these stimulation methods can also be applied in carbonate reservoirs, it may be difficult to predict effectiveness for increasing production from carbonate reservoirs.

Stimulation of carbonate formations usually involves a reaction between an acid and the minerals limestone ($CaCO_3$) or dolomite $CaMg(CO_3)_2$ that is intended to enhance the flow properties of the rock. In carbonate reservoirs, hydrochloric acid (HCl) is the most commonly applied stimulation fluid. Organic acids such as formic or acetic acid are used, mainly in retarded-acid systems or in high-temperature applications, to acidize either sandstones or carbonates. Stimulation of carbonate formations usually does not involve hydrofluoric acid, which is difficult to handle and commonly used in acidizing sandstone formations.

Problems with Using Acids in Wells

Although acidizing a portion of a subterranean formation can be very beneficial in terms of permeability, conventional acidizing systems have significant drawbacks. One major problem associated with conventional acidizing treatment systems is that deeper penetration into the formation is not usually achievable because, among other things, the acid may be spent before it can deeply penetrate into the subterranean formation. The rate at which acidizing fluids react with reactive materials in the subterranean formation is a function of various factors including, but not limited to, acid concentration, temperature, fluid velocity, mass transfer, and the type of reactive material encountered. Whatever the rate of reaction of the acidic solution, the solution can be introduced into the formation only a certain distance before it becomes spent. For instance, conventional acidizing fluids, such as those that contain hydrochloric acid, organic acids, or a mixture of hydrochloric and of hydrofluoric acids, have high acid strength and quickly react with the formation itself, fines and damage nearest the well bore, and do not penetrate the formation to a desirable degree before becoming spent. To achieve optimal results, it is desirable to maintain the acidic solution in a reactive condition for as long a period as possible to maximize the degree of penetration so that the permeability enhancement produced by the acidic solution may be increased.

Another problem associated with using acidic fluids is the corrosion caused by the acidic solution to any metals (such as tubulars) in the well bore and the other equipment used to carry out the treatment. For instance, conventional acidizing fluids have a tendency to corrode tubing, casing, and down hole equipment, such as gravel pack screens and down hole pumps, especially at elevated temperatures. The expense of repairing or replacing corrosion-damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation, which can compound the deeper penetration problem discussed above. The partial neutralization of the acid results in the production of quantities of metal ions that are highly undesirable in the subterranean formation.

Acid in Oil Emulsions

Historically, water-in-oil emulsified acids have primarily been used in fracture acidizing. The emulsified state of the acid makes it diffuse at much slower rate, thereby retarding the chemical reaction rate with the formation. However, the stability of the emulsion becomes questionable as the fluid experiences high temperature of the formation, that is, equal to or greater than about 121° C. (about 250° F.).

The corrosion inhibition for the tubulars of the well while pumping the acidizing fluid down hole to the treatment zone of a subterranean formation is always an issue.

In addition, the higher the temperature in the tubulars of the well and the higher the design temperature in the treatment zone of the subterranean formation, the greater the rate of corrosion, which increases the rate of damage to the tubulars.

Unfortunately, the compatibility of the corrosion inhibitor with the emulsifier in prior emulsified acidizing fluids is questionable, which significantly affects the temperature stability of emulsion.

The breaking of the emulsion before the targeted time can cause severe corrosion of the tubular.

Acid internal emulsions can be used to help separate the acid from the tubulars, but high concentrations of hydrochloric acid, a commonly used acid for acidizing, can be difficult to stabilize in an emulsion. Halliburton has used fumed silica in the aqueous phase of an emulsified acid system, however, this system and other systems do not provide emulsion stability at higher temperatures, that is, greater than about 121° C. (about 250° F.).

Therefore, among other needs, there is a need for acidizing treatment fluids and methods with acids for stimulation of carbonate formations at high temperatures, that is, equal to or greater than about 121° C. (about 250° F.) while offering minimum protection against corrosion.

SUMMARY OF THE INVENTION

According to an embodiment of the invention, a composition in the form of an emulsion is provided. A composition in the form of an emulsion having: (i) a continuous oil phase comprising: (a) an oil; (b) an emulsifier; and (ii) an internal aqueous phase comprising: (a) water; (b) acid such that the aqueous phase has an initial pH of less than about 2; (c) a viscosity-increasing agent; and (d) a crosslinker, wherein the crosslinker is selected or controlled to crosslink the viscosity-increasing agent at a pH range somewhere in a range of about 1.5 to about 6.5 and that is at least higher than the initial pH of the aqueous phase.

According to another embodiment of the invention, a method of acidizing a treatment zone of a subterranean formation in a well is provided. The method includes the steps of: (A) forming a treatment fluid comprising a composition according to the invention; and (B) introducing the treatment fluid into a well.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope of the invention as expressed in the appended claims.

DETAILED DESCRIPTION OF PRESENTLY PREFERRED EMBODIMENTS

Definitions and Usages
Interpretation

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, oil and gas are understood to refer to crude oil and natural gas. Oil and gas are naturally occurring hydrocarbons in certain subterranean formations.

A "subterranean formation" is a body of rock that has sufficiently distinctive characteristics and is sufficiently continuous for geologists to describe, map, and name it. A subterranean formation having a sufficient porosity and permeability to store and transmit fluids is sometimes referred to as a "reservoir." A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Carbonate, Sandstone, and Other Formations

Reservoirs can be of various rock materials.

As used herein, a subterranean formation having greater than about 50% by weight of inorganic carbonate materials (e.g., limestone or dolomite) is referred to as a "carbonate formation."

As used herein, a subterranean formation having greater than about 50% by weight of inorganic silicatious materials (e.g., sandstone) is referred to as a "sandstone formation."

Well Terms

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introduced at least into and through the wellhead. According to various techniques known in the art, tubulars, equipment, tools, or fluids can be directed from the wellhead into any desired portion of the wellbore.

As used herein, the word "tubular" means any kind of body in the form of a tube. Examples of tubulars include, but are not limited to, a drill pipe, a casing, a tubing string, a line pipe, and a transportation pipe. Tubulars can also be used to transport fluids into or out of a subterranean formation, such as oil, gas, water, liquefied methane, coolants, and heated fluids. For example, a tubular can be placed underground to transport produced hydrocarbons or water from a subterranean formation to another location.

As used herein, a "fluid" broadly refers to any fluid adapted to be introduced into a well for any purpose or any fluid flowed back or produced from a well. A fluid can be, for example, a drilling fluid, a cementing composition, a treatment fluid, or a spacer fluid. If a fluid is to be used in a relatively small volume, for example less than about 200 barrels (32 m$^3$), it is sometimes referred to as a wash, dump, slug, or pill.

As used herein, the word "treatment" refers to any treatment for changing a condition of a portion of a wellbore or an adjacent subterranean formation; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. Unless the context otherwise requires, the word "treatment" in the term "treatment fluid" does not necessarily imply any particular treatment or action by the fluid.

A zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

The term "damage" as used herein refers to undesirable deposits in a subterranean formation that may reduce its permeability. Scale, skin, gel residue, and hydrates are contemplated by this term. Also contemplated by this term are geological deposits, such as, but not limited to, carbonates located on the pore throats of sandstone in a subterranean formation.

As used herein, a downhole fluid is an in-situ fluid in a well, which may be the same as a fluid at the time it is introduced, or a fluid mixed with another other fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service. A well service may include design parameters such as fluid volume to be pumped, required pumping time for a treatment, or the shear conditions of the pumping.

The term "design temperature" refers to an estimate or measurement of the actual temperature at the downhole environment at the time of a well treatment. That is, design temperature takes into account not only the bottom hole static temperature ("BHST"), but also the effect of the temperature of the fluid on the BHST during treatment. The design temperature is sometimes referred to as the bottom hole circulation temperature ("BHCT"). Because treatment fluids may be considerably cooler than BHST, the difference between the two temperatures can be quite large. Ultimately, if left undisturbed, a subterranean formation will return to the BHST.

Physical States and Phases

As used herein, "phase" is used to refer to a substance having a chemical composition and physical state that is distinguishable from an adjacent phase of a substance having a different chemical composition or different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, unless the context otherwise requires, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions.

As used herein, "particulate" or "particulate material" refers to matter in the physical form of distinct particles in a solid or liquid state (which means such an association of a few atoms or molecules). A particulate is a grouping of particles based on common characteristics, including chemical composition and particle size range, particle size distribution, or median particle size. As used herein, a particulate is a grouping of particles having similar chemical composition and particle size ranges.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

The term "particulate" as used herein is intended to include material particles having the physical shape of platelets, shavings, flakes, ribbons, rods, strips, spheroids, toroids, pellets, tablets or any other physical shape.

If not otherwise stated, a reference to a single particle size means about the mid-point of the industry-accepted size range for the particulate.

The most commonly-used grade scale for classifying the diameters of sediments in geology is the Udden-Wentworth scale. According to this scale, a solid particulate having particles smaller than 2 mm in diameter is classified as sand, silt, or clay. Sand is a detrital grain between 2 mm (equivalent to 2,000 micrometers) and 0.0625 mm (equivalent to 62.5 micrometers) in diameter. (Sand is also a term sometimes used to refer to quartz grains or for sandstone.) Silt refers to particulate between 74 micrometers (equivalent to about −200 U.S. Standard mesh) and about 2 micrometers. Clay is a particulate smaller than 0.0039 mm (equivalent to 3.9 μm).

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified a number of different ways, including based on the size of the dispersed particles, the uniformity or lack of uniformity of the dispersion, and, if a fluid, whether or not precipitation occurs.

A dispersion is considered to be heterogeneous if the dispersed particles are not dissolved and are greater than about 1 nanometer in size. (For reference, the diameter of a molecule of toluene is about 1 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

Heterogeneous dispersions can be further classified based on the dispersed particle size.

A heterogeneous dispersion is a "suspension" where the dispersed particles are larger than about 50 micrometer. Such particles can be seen with a microscope, or if larger than about 50 micrometers (0.05 mm), with the unaided human eye. The dispersed particles of a suspension in a liquid external phase may eventually separate on standing, e.g., settle in cases where the particles have a higher density than the liquid phase. Suspensions having a liquid external phase are essentially unstable from a thermodynamic point of view; however, they can be kinetically stable over a long period depending on temperature and other conditions.

Homogeneous Dispersions: Solutions and Solubility

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

The "source" of a chemical species in a solution or fluid composition, can be a substance that makes the chemical species chemically available immediately or it can be a substance that gradually or later releases the chemical species to become chemically available.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

As used herein, a fluid is a substance that behaves as a fluid under Standard Laboratory Conditions, that is, at 77° F. (25° C.) temperature and 1 atmosphere pressure, and at the higher temperatures and pressures usually occurring in subterranean formations without applied shear.

Every fluid inherently has at least a continuous phase. A fluid can have more than one phase. The continuous phase of a fluid for use in a well is a liquid under Standard Laboratory Conditions. For example, a fluid can in the form of be a suspension (solid particles dispersed in a liquid phase), an emulsion (liquid particles dispersed in another liquid phase), or a foam (a gas phase dispersed in liquid phase).

As used herein, a water-based fluid means that water or an aqueous solution is the dominant material, that is, greater than 50% by weight, of the continuous phase of the substance.

In contrast, "oil-based" means that oil is the dominant material by weight of the continuous phase of the substance. In this context, the oil of an oil-based fluid can be any oil. In general, an oil is any substance that is liquid Standard Laboratory Conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. A "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or 50 viscometer or a CHANDLER™ 5550 HPHT viscometer. Such a viscometer measures viscosity as a function of time, temperature, and shear rate. The viscosity-measuring instrument can be calibrated using standard viscosity silicone oils or other standard viscosity fluids.

In general, a FANN™ Model 35 viscometer is used for viscosity measurements of less than about 30 mPa·s (cP). In addition, the Model 35 does not have temperature and pressure controls, so it is used for fluids at ambient conditions (that is, Standard Laboratory Conditions). Except to the extent otherwise specified, the apparent viscosity of a fluid having a viscosity of less than about 30 cP (excluding any suspended solid particulate larger than silt) is measured with a FANN™ Model 35 type viscometer with a bob and cup geometry using an R1 rotor, B1 bob, and F1 torsion spring at a shear rate of 511 sec$^{-1}$ (300 rpm) and at a temperature of 77° F. (25° C.) and a pressure of 1 atmosphere.

In general, a FANN™ Model 50 viscometer is used for viscosity measurements of greater than about 30 mPa·s (cP). The Model 50 has temperature and pressure controls. Except to the extent otherwise specified, the apparent viscosity of a fluid having a viscosity of greater than about 35 cP (excluding any suspended solid particulate larger than silt) is measured with a FANN™ Model 50 type viscometer with a bob and cup geometry using an R1 rotor, B5 bob, and 420 or 440 spring at a shear rate of 40 sec$^{-1}$ (47 rpm) and at a temperature of 77° F. (25° C.) and pressure about 500 psi.

A substance is considered to be a fluid if it has an apparent viscosity less than 5,000 mPa·s (cP) (independent of any gel characteristic). For reference, the viscosity of pure water is about 1 mPa·s (cP).

As used herein, for the purposes of matrix diversion a fluid is considered to be "viscous" if it has an apparent viscosity of 50 mPa·s (cP) or higher. The viscosity of a viscous fluid is considered to break or be broken if the viscosity is greatly reduced. Preferably, although not necessarily for all applications depending on how high the maximum viscosity of the fluid, the viscous fluid breaks to a viscosity of less than 50% of the viscosity of the maximum viscosity or less than 30 mPa·s (cP).

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

Any doubt regarding whether units are in U.S. or Imperial units, where there is any difference, U.S. units are intended. For example, "gal/Mgal" means U.S. gallons per thousand U.S. gallons ("GPT").

General Composition and Method

In general, the invention provides a treatment fluid in the form of an emulsion, which can be used for acid stimulation of a well. The fluid system has particular applicability in emulsified acid treatment. Such a system can be particularly useful for treating a zone of a carbonate formation.

A composition in the form of an emulsion is adapted to help physically separate the acid from metals in the well, such as the tubulars. The water with the acid is carried into the well and through the tubulars to the treatment zone as the internal phase of an external oil phase.

It has been a common observation that when an emulsion breaks during a corrosion test, the corrosion loss was unacceptably high according to industry standards. As the metal is directly exposed to weakly inhibited acid after the destabilization of emulsion, it is more quickly corroded.

However, the stability of such emulsions can be a problem, especially with high concentrations of strong acid in the internal water phase and at high temperatures. Without being limited by any theory, there are several theoretical bases for the lack of stability, ranging from the very different densities of the water and oil phases to chemical reactivity of a strong acid in the water phase. Among other factors and problems, it is believed that there is a problem with the compatibility of emulsifiers with chemical corrosion inhibitors, especially at higher temperatures. This can be a particular challenge at higher temperatures (greater than 250° F.) and with high concentrations of HCl acid, especially at about 24% or more.

The emulsifier is a critical factor in the stability of an emulsified acid treatment fluid. In addition, one or more corrosion inhibitors are also highly valuable components in any acid blend, and generally considered necessary components, but are considered to be the most damaging to the emulsifier performance as they are believed to contribute to destabilizing the emulsion.

In addition, chemical corrosion inhibitors and corrosion inhibitor intensifiers can be included to help reduce the corrosion of the metal goods in the well. This is especially desirable at high temperatures because the rate of acid corrosion increases with increasing temperature.

When an acidic fluid is used to stimulate a substantially acid-soluble producing, or potentially-producing, formation below the fracturing pressure, the treatment is called matrix stimulation or matrix acidizing. Numerous studies have shown that the dissolution pattern created by the flowing acid occurs by one of three mechanisms (a) compact dissolution, in which most of the acid is spent near the wellbore rock face; (b) wormholing, in which the dissolution advances more rapidly at the tips of a small number of wormholes than at the wellbore walls; and (c) uniform dissolution, in which many pores are enlarged. Compact dissolution occurs when acid spends on the face of the formation. In this case, the live acid penetration is commonly limited to within a few centimeters of the wellbore. Uniform dissolution occurs when the acid reacts under the laws of fluid flow through porous media. In this case, the live acid penetration will be, at most, equal to the volumetric penetration of the injected acid. (Uniform dissolution is also the preferred primary mechanism of conductive channel etching of the fracture faces in acid fracturing, as discussed above.) The objectives of the acidizing process are met most efficiently when near wellbore permeability is enhanced to the greatest depth with the smallest volume of acid. This occurs in regime (b) above, when a wormholing pattern develops.

However, just as wormholing prevents the growth of large fractures, wormholing prevents the uniform treatment of long horizontal or vertical regions of a formation. Once wormholes have formed, at or near a point in the soluble formation where the acid first contacts the formation, subsequently-injected acid will tend to extend the existing wormholes rather than create new wormholes further along the formation. Temporary blockage of the first wormholes is needed so that new wormholes can be formed and the entire section of the formation treated. This is called "diversion," as the treatment diverts later-injected acid away from the pathway followed by earlier-injected acid. In this case, the blockage must be temporary because all the wormholes are needed to serve as the primary production pathway.

In addition to protecting metal tubulars and other metal goods in a well against corrosion, acid-in-oil emulsions diffuse the acid at a slower rate relative to non-emulsified systems, thereby retarding the chemical reaction rate with formation. However, the effectiveness of such an emulsified fluid system can be questionable in cases of formations having high temperature or high permeability.

A high temperature of a subterranean formation causes the acid to spend at much faster rate, however, and, therefore, can cause face dissolution without creating good wormhole patterns. To overcome this, high pumping rates may be required, which may not always be feasible. There are different regimes of acid interaction with carbonate depending on pumping rate, that is, face dissolution (at very low pumping rate) and uniform dissolution (at very high pumping rate). There is one optimum rate in between where wormhole formation dominates. A skilled engineer will avoid the face dissolution regime to create wormholes (conductive channels), to bypass a damaged region, and to access the oil-rich region of a subterranean formation. The desired length of the wormholes is anywhere between about 30 cm (about 1 foot) to about 3 meters (about 10 feet) or longer, depending on the volume of treatment fluid that is pumped into a treatment zone. So the engineer designs the pumping rate to be as high as possible without fracturing of the subterranean formation. This will avoid face dissolution region and complete the treatment in shorter time.

Another problem can be fluid diversion between different zones if there are adjacent zones with high permeability differences. As used herein, low permeability means in the range of about 0.5 mDarcy to about 10 mDarcy, high permeability means in the range of about 50 mDarcy to about 1 Darcy, and a high permeability difference means a difference of about 5 to about 10 times in permeability in the zones near to each other.

This invention provides an acid-in-oil emulsion system with the internal phase having an in situ gelling system. The external oil phase provides enhanced corrosion protection. The emulsion provides initial fluid viscosity. The inner phase is water with an acid. The gelling system is preferably a polymeric viscosity-increasing agent and a crosslinker, which crosslink in a suitable pH range. The internal phase preferably also includes a corrosion inhibitor and intensifier.

Overall, this system provides dual mechanisms for retarding the acid, that is, retardation due to emulsification and retardation due to in situ crosslinking. The dual retardation of the acid reaction is expected to improve the stimulation performance in cases of high temperature zones requiring matrix diversion for acidizing treatment.

The external oil phase controls the acid spending rate in case of high temperature wells, thereby generating good wormhole patterns. Emulsified acid systems particularly require lower acid volumes for matrix acidizing compared to non-emulsified acids due to high efficiency of the emulsified systems. Experimental results have shown that emulsified acids create better wormholes in lesser volumes due to its mechanism of interaction with carbonate.

The internal phase of the emulsified acid increases viscosity as the acid spends on the carbonate via in-situ pH-dependent crosslinking. This helps in achieving better diversion in an acidizing treatment.

A treatment fluid according to the invention can have a viscosity higher than 100 cP at 40 l/s. As the acid spends, gelling agent in the water phase starts crosslinking, and, therefore, will build a higher viscosity, for example, greater than 30 cP at 511 l/s shear rate.

Preferably, the emulsifier used does not function as an emulsifier if the pH of internal phase is greater than about 5, that is, once acid spends the emulsifier cannot emulsify the dilute phase in oil.

Once the acid spends completely, the emulsion breaks and the crosslinking breaks. This will cause little or no residue damage to the formation. Developing relatively high viscosity in a subterranean formation leads to fluid matrix diversion and improved zonal coverage.

Accordingly, this fluid will perform as per two mechanisms, which can occur simultaneously: (A) acid will begin spending against the formation by diffusion through the oil phase, such that as the pH of the water phase increases, it will ultimately break the emulsion; and (B) as the pH of the water phase increases, the gelling agent in the water phase will start crosslinking, which increase the viscosity of the water phase. The acid reaction rate with the formation will also be slowed due to the increased viscosity of the water phase. As the acid spends more completely, the crosslinking will be broken. After the acid spends completely, cleanup of the fluid can be achieved easily. With both the emulsion broken and the crosslinking in the water phase broken, the fluid residues can be easily flowed back from the formation leaving minimal damage.

The combination of emulsified acid in situ crosslinking acid can allow the existing matrix treatments to be carried out at much higher temperature with better diversion and efficiency. The presence of the oil phase surrounding the acid and the increased viscosity of the system can contribute in reducing the diffusion rate of the acid, which can provide more retarded acid reaction as well.

The treatment fluid and method provides a fluid having relatively high viscosity properties in a formation, even at high temperatures, leading to good matrix diversion and improved zonal coverage. The dual system of emulsion and in situ crosslinking can result in efficient stimulation of oil production from subterranean formation having a high temperature, that is, wherein the design temperature is at least about 121° C. (about 250° F.). It is believed that the dual retardation effect will be particularly useful at high temperatures greater than about 150° C. (about 300° F.) where emulsified acid alone would be inefficient due to the higher acid reaction rate and might give inefficient diversion due to broken emulsion if in case.

According to an embodiment of the invention, a composition in the form of an emulsion is provided. The composition includes: (i) a continuous oil phase comprising: (a) an oil; (b) an emulsifier; and (ii) an internal aqueous phase comprising: (a) water; (b) acid such that the aqueous phase has an initial pH of less than about 2; (c) a viscosity-increasing agent; and (d) a crosslinker, wherein the crosslinker is selected or controlled to crosslink the viscosity-increasing agent at a pH somewhere in a range of about 1.5 to about 6.5 and that is at least higher than the initial pH of the aqueous phase.

According to another embodiment of the invention, a method of acidizing a treatment zone of a subterranean formation in a well is provided. The method includes the steps of: (A) forming a treatment fluid comprising a composition according to the invention; and (B) introducing the treatment fluid into a well.

The improved stability of the emulsion and the slower diffusion of acid from the internal phase of the acidizing fluid is believed to improve the stimulation performance, especially in a carbonate formation.

The invert emulsion based fluid system is designed for efficient acid stimulation treatment of a subterranean formation.

The primary goal behind using emulsified acid is that it will react slowly with the carbonates compared to plain acid particularly at high temperatures. The more retarded release of the acid will allow use of acid system at much higher temperature (i.e., better performance at higher temperature).

Emulsion

An emulsion is a fluid including a dispersion of immiscible liquid particles in an external liquid phase. In addition, the proportion of the external and internal phases is above the solubility of either in the other.

An emulsion can be an oil-in-water (o/w) type or water-in-oil (w/o) type. A water-in-oil emulsion is sometimes referred to as an invert emulsion. In the context of an emulsion, a "water phase" refers to a phase of water or an aqueous solution and an "oil phase" refers to a phase of any non-polar organic liquid that is immiscible with water, such as petroleum, kerosene, or synthetic oil.

It should be understood that multiple emulsions are possible. These are sometimes referred to as nested emulsions. Multiple emulsions are complex polydispersed systems where both oil-in-water and water-in-oil emulsions exist simultaneously in the fluid, wherein the oil-in-water emulsion is stabilized by a lipophilic surfactant and the water-in-oil emulsion is stabilized by a hydrophilic surfactant. These include water-in-oil-in-water (w/o/w) and oil-in-water-in-oil (o/w/o) type multiple emulsions. Even more complex polydispersed systems are possible. Multiple emulsions can be formed, for example, by dispersing a water-in-oil emulsion in water or an aqueous solution, or by dispersing an oil-in-water emulsion in oil.

A stable emulsion is an emulsion that will not cream, flocculate, or coalesce under certain conditions, including time and temperature. As used herein, the term "cream" means at least some of the droplets of a dispersed phase converge towards the surface or bottom of the emulsion (depending on the relative densities of the liquids making up the continuous and dispersed phases). The converged droplets maintain a discrete droplet form. As used herein, the term "flocculate" means at least some of the droplets of a dispersed phase combine to form small aggregates in the emulsion. As used herein, the term "coalesce" means at least some of the droplets of a dispersed phase combine to form larger drops in the emulsion.

Preferably, an emulsion should be stable under one or more of certain conditions commonly encountered in the storage and use of such an emulsion composition for a well treatment operation. It should be understood that the dispersion is visually examined for creaming, flocculating, or coalescing.

One approach to increasing the viscosity of a fluid is the use of an emulsion. The internal-phase droplets of an emulsion disrupt flow streamlines and require more effort to get the same flow rate. Thus, an emulsion tends to have a higher viscosity than the external phase of the emulsion would otherwise have by itself. This property of an emulsion can be used to help suspend a particulate material in an emulsion. This technique for increasing the viscosity of a liquid can be used separately or in combination with other techniques for increasing the viscosity of a fluid.

As used herein, to "break," in regard to an emulsion, means to cause the creaming and coalescence of emulsified drops of the internal dispersed phase so that the internal phase separates out of the external phase. Breaking an emulsion can be accomplished mechanically (for example, in settlers, cyclones, or centrifuges), or via dilution, or with chemical additive to increase the surface tension of the internal droplets.

Oil Phase

In a preferred embodiment of the invention, the oil of the oil phase is selected from the group consisting of petroleum, diesel, kerosene, or synthetic oil. An example of a synthetic oil is a long-chain alkane.

Emulsifier

Surfactants are compounds that lower the surface tension of a liquid, the interfacial tension between two liquids, or that between a liquid and a solid. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water soluble portion.

In a water phase, surfactants form aggregates, such as micelles, where the hydrophobic tails form the core of the aggregate and the hydrophilic heads are in contact with the surrounding liquid. Other types of aggregates such as spherical or cylindrical micelles or bilayers can be formed. The shape of the aggregates depends on the chemical structure of the surfactants, depending on the balance of the sizes of the hydrophobic tail and hydrophilic head.

As used herein, the term micelle includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. Micelles can function, among other purposes, to stabilize emulsions, break emulsions, stabilize a foam, change the wettability of a surface, solubilize certain materials, or reduce surface tension.

As used herein, an "emulsifier" refers to a type of surfactant that helps prevent the droplets of the dispersed phase of an emulsion from flocculating or coalescing in the emulsion. As used herein, an emulsifier refers to a chemical or mixture of chemicals that helps prevent the droplets of the dispersed phase of an emulsion from flocculating or coalescing in the emulsion. As used herein, an "emulsifier" or "emulsifying agent" does not mean or include a hydrophobic particulate.

An emulsifier can be or include a cationic, a zwitterionic, or a nonionic emulsifier. A surfactant package can include one or more different chemical surfactants.

The hydrophilic-lipophilic balance ("HLB") of a surfactant is a measure of the degree to which it is hydrophilic or lipophilic, determined by calculating values for the different regions of the molecule, as described by Griffin in 1949 and 1954. Other methods have been suggested, notably in 1957 by Davies.)

In general, Griffin's method for non-ionic surfactants as described in 1954 works as follows:

$$HLB = 20 * Mh/M$$

where Mh is the molecular mass of the hydrophilic portion of the molecule, and M is the molecular mass of the whole molecule, giving a result on a scale of 0 to 20. An HLB value of 0 corresponds to a completely lipidphilic/hydrophobic molecule, and a value of 20 corresponds to a completely hydrophilic/lypidphobic molecule. Griffin W C: "Classification of Surface-Active Agents by 'HLB,'" Journal of the Society of Cosmetic Chemists 1 (1949): 311. Griffin W C: "Calculation of HLB Values of Non-Ionic Surfactants," Journal of the Society of Cosmetic Chemists 5 (1954): 249.

The HLB (Griffin) value can be used to predict the surfactant properties of a molecule, where a value less than 10 indicates that the surfactant molecule is lipid soluble (and water insoluble), whereas a value greater than 10 indicates that the surfactant molecule is water soluble (and lipid insoluble).

In 1957, Davies suggested an extended HLB method based on calculating a value based on the chemical groups of the molecule. The advantage of this method is that it takes into account the effect of stronger and weaker hydrophilic groups. The method works as follows:

$$HLB = 7 + m*Hh - n*Hl$$

where m is the number of hydrophilic groups in the molecule, Hh is the respective group HLB value of the hydrophilic groups, n is the number of lipophilic groups in the molecule, and Hl is the respective HLB value of the lipophilic groups. The specific values for the hydrophilic and hydrophobic groups are published. See, e.g., Davies J T: "A quantitative kinetic theory of emulsion type, I. Physical chemistry of the emulsifying agent," Gas/Liquid and Liquid/Liquid Interface. Proceedings of the International Congress of Surface Activity (1957): 426-438.

The HLB (Davies) model can be used for applications including emulsification, detergency, solubilization, and other applications. Typically a HLB (Davies) value will indicate the surfactant properties, where a value of 1 to 3 indicates anti-foaming of aqueous systems, a value of 3 to 7 indicates W/O emulsification, a value of 7 to 9 indicates wetting, a value of 8 to 28 indicates O/W emulsification, a value of 11 to 18 indicates solubilization, and a value of 12 to 15 indicates detergency and cleaning.

In an embodiment, the emulsifier is an water-in-oil emulsifier according to the HBL (Davies) scale, that is, having an HLB (Davies) in the range of about 3 to about 7.

According to a preferred embodiment of the invention, the emulsifier is a cationic amine. Preferably, the cationic amine is a fatty cationic amine having more than 12 carbon atoms.

According to a preferred embodiment, the emulsifier comprises about 50% tallow alkyl amine acetates, C16-C18 (known as CAS 61790-60) in a suitable solvent such as heavy aromatic naphtha and ethylene glycol.

In an embodiment, the emulsifier is preferably in a concentration of at least 1% by weight of the emulsion. More preferably, the emulsifier is in a concentration in the range of 1% to 10% by weight of the emulsion.

Preferably, the emulsifier is added to oil phase. In addition, the emulsifier is preferably selected for being specific for stabilizing at least an HCl acid internal phase. Cationic amines are preferred.

Water Phase

Preferably, the water for use in the treatment fluid does not contain anything that would adversely interact with the other components used in the fluid or with the subterranean formation.

The aqueous phase can include freshwater or non-freshwater. Non-freshwater sources of water can include surface water ranging from brackish water to seawater, brine, returned water (sometimes referred to as flowback water) from the delivery of a fluid into a well, unused fluid, and produced water. As used herein, brine refers to water having at least 40,000 mg/L total dissolved solids.

In some embodiments, the aqueous phase of the treatment fluid may comprise a brine. The brine chosen should be compatible with the formation and should have a sufficient density to provide the appropriate degree of well control.

Salts may optionally be included in the treatment fluids for many purposes. For example, salts may be added to a water source, for example, to provide a brine, and a resulting treatment fluid, having a desired density. Salts may optionally be included for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid.

Suitable salts can include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Water Phase Including Acid

The water includes one or more acids that are sufficiently strong and in a sufficient concentration to cause the water to have a pH of less than about 2. Preferably, the initial pH is less than about 1.5. More preferably, the water has a pH less than zero. For example, at least 5% hydrochloric acid can be used. While other acids can be used, the strong acid preferably comprises hydrochloric acid. For example, sulfuric acid would produce undesirable sulfur dioxide. Weak acids can work; however, they tend to have lower acid solubility so they are not preferred. As the purpose is to treat carbonate materials, hydrofluoric acid is not required and preferably avoided due to handling issues.

In a preferred embodiment, the hydrochloric acid is in a concentration of at least 5% by weight of water of the internal aqueous phase. More preferably, the hydrochloric acid is in a concentration in the range of about 24% to about 28% by weight of water of the internal aqueous phase.

Water Phase Including pH-Dependent Viscosity-Increasing System

A viscosity-increasing agent can be used to increase the ability of a fluid. A viscosity-increasing agent can be used for other purposes, such as matrix diversion, conformance control, or friction reduction.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers (e.g., a polyacrylamide).

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polymeric viscosity-increasing agent can form a gel with water. Gel formation is based on a number of factors including the particular polymer and concentration thereof, the particular crosslinker and concentration thereof, the degree of crosslinking, temperature, and a variety of other factors known to those of ordinary skill in the art.

Cross-linking agents typically comprise at least one metal ion that is capable of cross-linking the viscosity-increasing agent molecules.

Certain cross-linking agents are pH-dependent. Preferably, the in-situ crosslinking agent is pH dependent. The crosslinker performs in certain pH range, that is, somewhere in a range between about pH 1.5 and about pH 6.5. Initially, the acid preferably has pH less than 1 as the concentration of acid (HCl) is greater than 5%. As acid starts spending on the carbonate the neutralizations starts, that is, the pH of the water phase starts to increase. Once the pH comes near 1 or above, the crosslinkers starts crosslinking the gelling agents. Due to crosslinked acid phase the acid spending rate decreases further. Over the time the acid continue to spend and therefore pH reaches 4 or above and the cross linker is no more active above this pH rage and system gets de-crosslinked. This breaks the crosslinking.

If used, a viscosity-increasing agent may be present in the fluids in a concentration in the range of from about 0.01% to about 5% by weight of the phase for which the viscosity is to be increased.

Where present, the cross-linking agent generally should be included in the fluids in an amount sufficient, among other things, to provide the desired degree of cross linking. In some embodiments, the cross-linking agent may be present in the treatment fluids in an amount in the range of from about 0.01% to about 5% by weight of the treatment fluid.

In a preferred embodiment, the polymeric viscosity-increasing agent is a polyacrylamide based polymer. The polyacrylamide based polymer is preferably either anionic or cationic in nature.

An example of a pH-dependent crosslinker is iron chloride (also known as ferric chloride or $FeCl_3$).

Another example of a self-diverting acid system is described in European Patent Application Publication No. 0278540 B1, assigned to Schlumberger Technology. The strongly acidic system initially has low viscosity but includes a soluble ferric ion source and a polymeric gelling agent that is crosslinked by ferric ions at a pH of about 2 or greater but not at a lower pH. However, the polymer is not crosslinked by ferrous ions. Therefore, the system includes a reducing agent that reduces ferric ions to ferrous ions, but only at a pH above about 3 to 3.5. Consequently, as the acid spends, for example in a wormhole, and the pH increases to about 2 or greater, the polymer crosslinks, and a very viscous gel forms that inhibits further flow of fresh acid into the wormhole. As the acid spends further and the pH continues to rise, the reducing agent converts the ferric ions to ferrous ions and the gel reverts to a more fluid water-like state. Hydrazine salts and hydroxylamine salts are specified as the reducing agents.

Emulsion Proportions

According to a preferred embodiment of the invention, the emulsified acid has the following proportions: (a) from about 13 vol % to about 45 vol % of the at least one oil; and (b) from about 50 vol % to about 85 vol % of the aqueous acid solution.

Corrosion Inhibitor

Examples of corrosion inhibitors include acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, acetylenic alcohols, fluorinated surfactants, quaternary derivatives of heterocyclic nitrogen bases, quaternary derivatives of halomethylated aromatic compounds, combinations of such compounds used in conjunction with iodine; quaternary ammonium compounds; and combinations thereof. Suitable corrosion inhibitors and intensifiers are available from Halliburton Energy Services and include: "MSA-II™" corrosion inhibitor, "MSA-III" corrosion inhibitor, "HAI-25 E+" environmentally friendly low temp corrosion inhibitor, "HAI404™" acid corrosion inhibitor, "HAI-50™" Inhibitor, "HAI-60™" Corrosion inhibitor, "HAI-62™" acid corrosion inhibitor, "HAI-65™" Corrosion inhibitor, "HAI-72E+™" Corrosion inhibitor, "HAI-75™" High temperature acid inhibitor, "HAI-81M™" Acid corrosion inhibitor, "HAI-85™" Acid corrosion inhibitor, "HAI-85M™" Acid corrosion inhibitor, "HAI-202 Environmental Corrosion Inhibitor," "HAI-OS" Corrosion Inhibitor, "HAI-GE" Corrosion Inhibitor, "FDP-S692-03" Corrosion inhibitor for organic acids, "FDP-S656AM-02" and "FDP-S656BW-02" Environmental Corrosion Inhibitor System, "HII-500" Corrosion inhibitor intensifier, "HII-500M" Corrosion inhibitor intensifier, "HII-124" Acid inhibitor intensifier, "HII-124B" Acid inhibitor intensifier, "HII-124C™" Inhibitor intensifier, and "HII-124F™" corrosion inhibitor intensifier.

HAI-404M™ is a cationic corrosion inhibitor with a quaternary compound. Typical concentrations of HAI-404M™ are in the range of about 8 gal/Mgal to about 12 gal/Mgal. HAI-404M™ acid corrosion inhibitor, formerly known as HAI-404™ acid corrosion inhibitor, is a high-performance, cationic acid corrosion inhibitor designed for use in hydrochloric acids (HCl) blends. Alloys N-80, J-55, 13Cr, S13Cr 110, 22Cr and 25Cr can be effectively inhibited with HAI-404M™ inhibitor.

HAI-OS™ is a nonionic HCl corrosion inhibitor. It demonstrates excellent solubility in weighted and un-weighted fluids at room temperature and bottom hole static temperature (BHST). It has been tested in 15% HCl, 28% HCl, Sandstone Completion Acid, and weighted acid blends. Typical concentrations used are in the range of about 8 gal/Mgal to about 16 gal/Mgal.

According to a preferred embodiment of the invention, the corrosion inhibitor is selected from the group consisting of: a quaternary ammonium salt such as 1-(benzyl) quinolinium chloride, preferably together with an aldehyde.

The corrosion inhibitor is preferably in a concentration of at least 0.1% by weight of the emulsion. More preferably, the corrosion inhibitor is in a concentration in the range of 0.1% to 5% by weight of the emulsion.

Corrosion Inhibitor Intensifier

A corrosion inhibitor intensifier enhances the effectiveness of a corrosion inhibitor over the effectiveness of the corrosion inhibitor without the corrosion inhibitor intensifier. According to a preferred embodiment of the invention, the corrosion inhibitor intensifier is selected from the group consisting of: formic acid and potassium iodide.

Formic acid (95% aqueous solution) is a corrosion inhibitor intensifier.

Potassium iodide is another corrosion-inhibitor intensifier, which when used with some reducing agents, helps convert ferric iron to ferrous iron in unspent acid. Potassium iodide intensifier can be used in acid systems containing up to 28% hydrochloric acid (HCl). It is especially effective in combination with formic acid or HII-124C™ intensifiers. Potassium iodide intensifier is effective at bottom hole temperatures (BHTs) up to at least 425° F. (218° C.). Intensifier concentrations typically vary between about 1 lb/Mgal to about 100 lb/Mgal. Potassium iodide intensifier can be used with all acid-corrosion inhibitors. It is not compatible with diazonium salts, oxidants, or bromine. When used with an appropriate reducing agent, it will help decrease corrosion rates, additive separation, sludging, and emulsions caused by ferric iron.

The corrosion inhibitor intensifier is preferably in a concentration of at least 0.1% by weight of the emulsion. More preferably, the corrosion inhibitor intensifier is in a concentration in the range of 0.1% to 20% by weight of the emulsion.

Other Additives

The emulsion can also include other additives. For example, the emulsion can contain a freezing-point depressant. Preferably, the freezing point depressant is for the water of the continuous phase. Preferably, the freezing-point depressant is selected from the group consisting of water soluble ionic salts, alcohols, glycols, urea, and any combination thereof in any proportion.

Methods

According to an embodiment of the invention, a method of acidizing a treatment zone of a subterranean formation in a well is provided. The method includes the steps of: (A) forming a treatment fluid comprising a composition according to the invention; and (B) introducing the treatment fluid into a well.

According to a preferred embodiment of the method, the subterranean formation to be treated is a carbonate formation.

In an embodiment, the design temperature is at least about 121° C. (about 250° F.). The design temperature can be, for example, at least about 135° C. (about 275° F.).

The treatment fluid may be prepared at the job site, prepared at a plant or facility prior to use, or certain components of the treatment fluid (e.g., the continuous liquid phase and the viscosity-increasing agent) may be pre-mixed prior to use and then transported to the job site. Certain components of the treatment fluid may be provided as a "dry mix" to be combined with the continuous liquid phase or other components prior to or during introducing the treatment fluid into the subterranean formation. In certain embodiments, the treatment fluid may be placed into the subterranean formation by placing the treatment fluid into a well bore that penetrates a portion of the subterranean formation.

In certain embodiments (e.g., fracturing operations), the treatment fluid may be introduced into the subterranean formation at or above a pressure sufficient to create or enhance one or more fractures in a portion of the subterranean formation. In an embodiment, the step of introducing comprises introducing under conditions for fracturing a treatment zone. The fluid is introduced into the treatment zone at a rate and pressure that are at least sufficient to fracture the zone.

In an embodiment, the step of introducing is at a rate and pressure below the fracture pressure of the treatment zone.

In some embodiments, placing the treatment fluid into the subterranean formation comprises placing the treatment fluid into a well bore penetrating the subterranean formation.

In an embodiment, the treatment fluid is allowed time for spending the acid against the treatment zone, which is also expected to break the emulsion.

In an embodiment, a step of flowing back from the treatment zone is within 24 hours of the step of introducing. In another embodiment, the step of flowing back is within 16 hours of the step of introducing.

Preferably, after any such well treatment, a step of producing hydrocarbon from the subterranean formation is the desirable objective.

Conclusion

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of acidizing a treatment zone of a subterranean formation in a well, the method comprising the steps of:
    (A) forming a treatment fluid in the form of an emulsion, the treatment fluid comprising:
        (i) a continuous oil phase comprising:
            (a) an oil; and
            (b) an emulsifier; and
        (ii) an internal aqueous phase comprising:
            (a) water;
            (b) acid such that the aqueous phase has an initial pH of less than about 2;
            (c) a viscosity-increasing agent; and
            (d) a crosslinker, wherein the crosslinker is selected or controlled to crosslink the viscosity-increasing agent at a pH range somewhere in a range of about 1.5 to about 6.5 and that is at least higher than the initial pH of the aqueous phase; and
    (B) introducing the treatment fluid into a well, wherein a design temperature in the subterranean formation is at least about 121° C. (about 250° F.).

2. The method according to claim 1, wherein the oil of the external oil phase comprises an oil selected from the group consisting of petroleum, diesel, kerosene, or synthetic oil.

3. The method according to claim 1, wherein the emulsifier is a cationic amine.

4. The method according to claim 1, wherein the acid comprises a strong acid.

5. The method according to claim 4, wherein the strong acid comprises hydrochloric acid in a concentration of at least 5% by weight of water of the internal aqueous phase.

6. The method according to claim 4, wherein the strong acid comprises hydrochloric acid in a concentration in the range of about 24% to about 28% by weight of water of the internal aqueous phase.

7. The method according to claim 1, wherein the viscosity-increasing agent comprises a polyacrylamide based-polymer.

8. The method according to claim 1, wherein the crosslinker comprises ferric chloride.

9. The method according to claim 1, additionally comprising a corrosion inhibitor.

10. The method according to claim 9, additionally comprising a corrosion inhibitor intensifier.

11. The method according to claim 1, wherein the subterranean formation is a carbonate formation.

\* \* \* \* \*